B. F. MAYO.
HEEL NAILING MACHINE.
APPLICATION FILED JAN. 18, 1902.

1,000,534.

Patented Aug. 15, 1911.
6 SHEETS—SHEET 1.

B. F. MAYO.
HEEL NAILING MACHINE.
APPLICATION FILED JAN. 18, 1902.

1,000,534.

Patented Aug. 15, 1911.

UNITED STATES PATENT OFFICE.

BENJAMIN F. MAYO, OF SALEM, MASSACHUSETTS, ASSIGNOR TO UNITED SHOE MACHINERY COMPANY, OF PATERSON, NEW JERSEY, AND BOSTON, MASSACHUSETTS, A CORPORATION OF NEW JERSEY.

HEEL-NAILING MACHINE.

1,000,534.  Specification of Letters Patent.  Patented Aug. 15, 1911.

Application filed January 18, 1902. Serial No. 90,313.

*To all whom it may concern:*

Be it known that I, BENJAMIN F. MAYO, a citizen of the United States, residing at Salem, in the county of Essex and State of Massachusetts, have invented an Improvement in Heel-Nailing Machines, of which the following description, in connection with the accompanying drawings, is a specification, like letters on the drawings representing like parts.

This invention relating to heel nailing machines has for its object the production of a machine which will perform many of the operations heretofore performed by hand.

The improvements are represented as applied to a machine of the type shown in Letters Patent No. 694656, dated March 4, 1902.

In the machine embodying my invention which is herein shown and described, the nails used are fed through a suitable foot plate to a device commonly known as a "mug" which may be removed readily and replaced by a different mug to adapt the machine to any desired outline of nailing. The mug supplies the nails received in it from the nail assorting mechanism to holes in a nail carrier which has connected with it a driver plate movable with the nail-carrier from the position in which the nail-carrier receives the nails into the position it occupies while the nails are driven from the carrier into a heel to attach it to a shoe. The upper ends of the drivers carried by the driver-plate extend into the holes in the nail-carrier and the nails are supported by the drivers while the nail-carrier is being moved from nail receiving position into the attaching position. When in position for the heel attaching operation the carrier is below a stationary nailing block, and in the operation of driving the nails the nail-carrier rises until it contacts with the nailing block and is arrested, and then the drivers continuing to rise drive the nails from the carrier through the nailing block and into the heel, attaching the heel to the boot or shoe. The heel and top-lift carriers are connected by an adjusting device which enables the carriers to be adjusted relatively one to the other, that they may be accurately positioned with relation both to suitable magazines which supply them with heels and top-lifts, and also with relation to the nailing block upon which they are to deliver the heels and top-lifts in accurate position for attachment to the shoe. The gages of the heel and top-lift carriers are automatically moved relatively to provide a space for the entrance between said gages of a heel or top-lift blank, and are then moved relatively to clamp the blank while it is being moved into position above the nailing block.

In heel nailing machines as heretofore constructed employing heel and top-lift carriers, said carriers have been sustained by a movable head secured to the upper end of a spindle which when elevated acted to drive nails into the heel from a nail block mounted on said movable head. In the operation of attaching a heel and top-lift such spindle and nail block have been given two vertical movements.

In the machine herein described showing my invention in one of the best forms now known to me, I employ a stationary nailing block, and the spindle is moved toward and from said block.

The framework A of the machine, the beam A', mounted at the upper end thereof on a stud $A^x$ and supporting the spindle $A'^x$ that carries the shoe jack $A^2$ on which is mounted the shoe to which the heel is to be attached, the link $A^3$ connected to the rear end of said beam, and the spindle B, movable vertically in guideway B', are and may be substantially as shown in United States Patent No. 694,656, dated March 4, 1902, but the machine herein shown contains novel actuating mechanism for the beam A' and the spindle B.

Figures 1, 2:
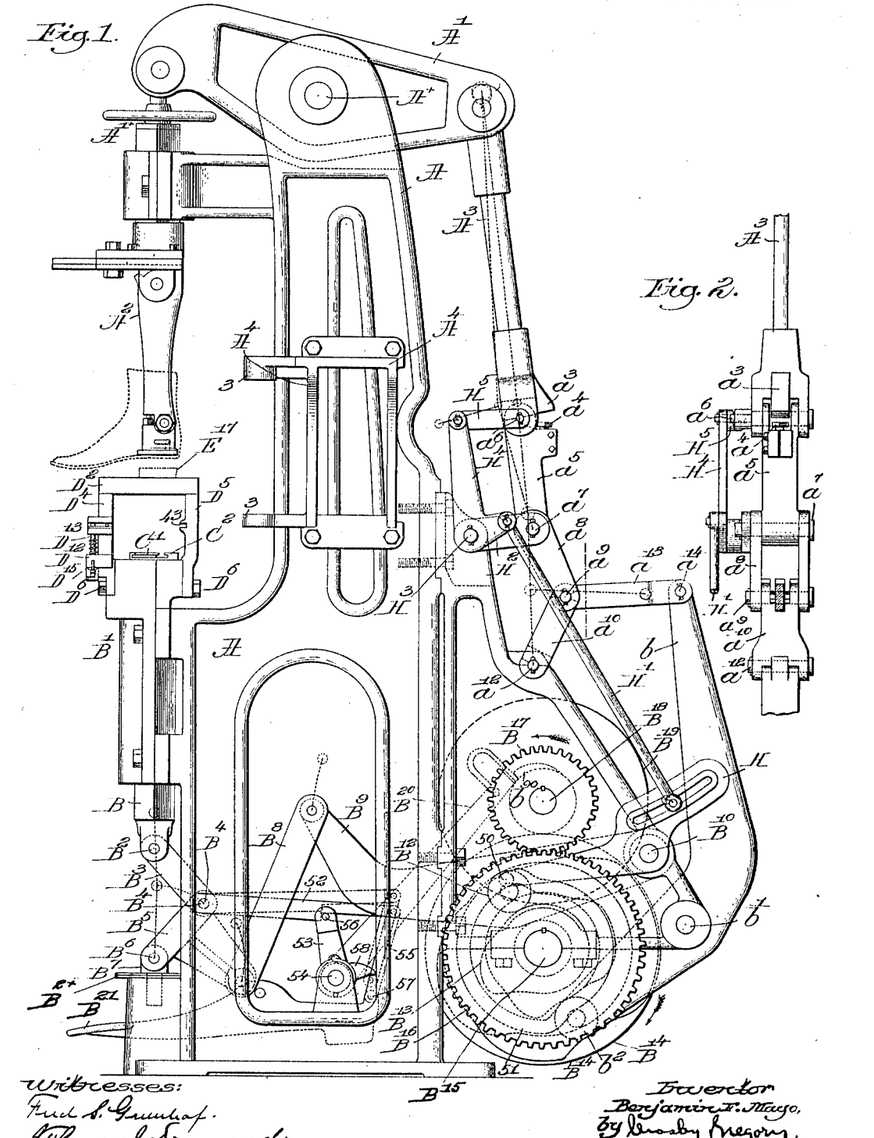
Figure 1, in side elevation, represents a portion of a heel nailing machine chiefly to show the beam carrying the jack on which the shoe to be heeled is mounted, and the spindle and stationary nail block, together with the actuating devices for said beam and spindle; the magazines, heel and top-lift carriers, nail-carrier and driver-plate, being omitted because those parts are fully shown on a larger scale in other figures.
Fig. 2 is a view looking from the rear of the machine, or from the right, Fig. 1, showing part of the beam actuating mechanism.
Figure 3:
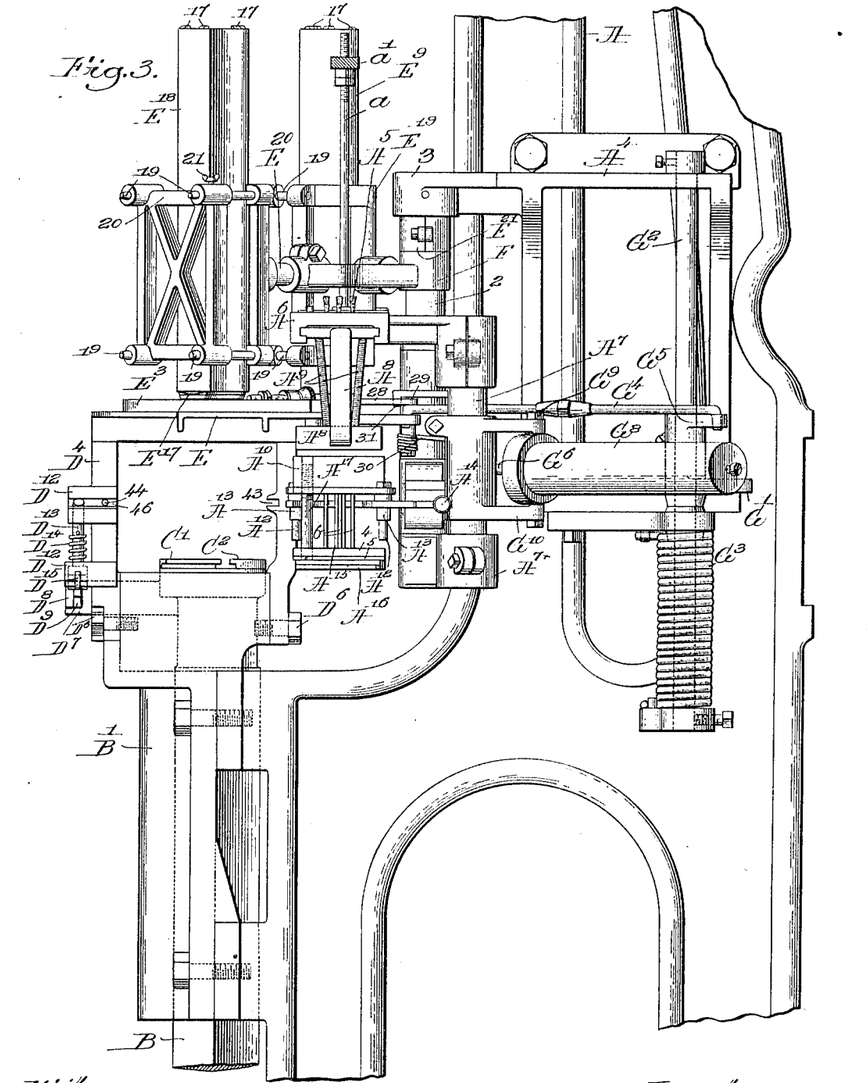
Fig. 3 is a side elevation of the right side of the machine, on a larger scale, showing the foot and devices for receiving the nails from the nail assorting mechanism, the heel and top-lift carriers, the nail-carrier, driver plate and drivers, the nail-carrier being in position to be supplied with nails.

The lower end of the spindle has a pin $B^2$ to which is joined one member $B^3$ of a toggle, said member being connected by a pin $B^4$ with the second toggle member $B^5$, shown as of elbow shape and pivoted at $B^6$ on a post or stud $B^7$ made adjustable in any usual way, as by the interposition of one or more shims $B^{2x}$, see Fig. 1.

The inner end of the toggle member $B^5$ has joined to it a link $B^8$ in turn joined to a lever $B^9$ free to turn about a stud $B^{10}$, said lever having a roller $B^{12}$ that enters the cam groove $B^{13}$ in one side of a disk $B^{14}$, fast on a shaft $B^{15}$, having a connected gear $B^{16}$, which gear is actuated by a pinion $B^{17}$ fast on the main or driving shaft $B^{18}$, having a belt pulley $B^{19}$.

The pulley is connected with the shaft through a clutch, which forms no part of the present invention and is therefore not herein described. The arrangement is such that when a stop arm $B^{20}$ on a shaft 54 controlled by a treadle $B^{21}$, is lifted from engagement with a projection $b^{90}$ forming part of the clutch, the shaft $B^{18}$, and the pinion $B^{17}$ will be started, and when the stop arm again meets said projection the shaft will be stopped.

The upper end of the spindle has connected with it by screws C two plates C', $C^2$, the edges of which overhang as represented in Figs. 1, 3, 7 and 8, to form part of a clutch to be described. The upper end of the spindle B is provided with two bores $C^3$, $C^4$. The bore $C^4$ receives a spring $C^5$ upon the upper end of which is mounted a follower $C^6$, and the bore $C^3$ receives a guiding post $A^{17}$ on the nail-carrier when the spindle is raised to drive the nails.

The frame has at one side a projection $A^4$, which sustains any usual or suitable nail assorting mechanism, such for instance as represented in United States Letters Patent No. 707,136, granted August 19, 1902. Such mechanism, forming no part of the present invention, is not herein shown or described. The nails delivered from the mechanism all pointing the same way will enter tubes or guideways $A^5$ that are connected at their lower ends with a foot $A^6$ sustained by a post $A^7$ erected on an arm $A^{7x}$, the foot having a series of holes therethrough to lead the nails into a device $A^8$, commonly called a "mug", detachably connected with said foot, and, as herein represented, the top plate and bottom plate of the mug are united by suitable tubes $A^9$ represented as spiral springs which guide the nails to the lower plate of the mug on their way into a nail-carrier $A^{10}$.

The nail-carrier represented, like a "multiple die", has a large number of nail holes of which such number may be used as are necessary for the desired outline of nailing. The carrier has depending from it two like studs $A^{12}$, that enter guiding bosses $A^{13}$ of a nail carrier sustaining device shown as a lever $A^{14}$, movable freely in a horizontal plane, said lever as shown turning about a stud 2, held in like ears 3 projecting from the framework. The studs $A^{12}$ are loosely received in the bosses $A^{13}$, so as to permit the nail-carrier to be moved vertically with relation to the supporting lever $A^{14}$ during the heel-attaching operation, as will be explained.

Figure 8:
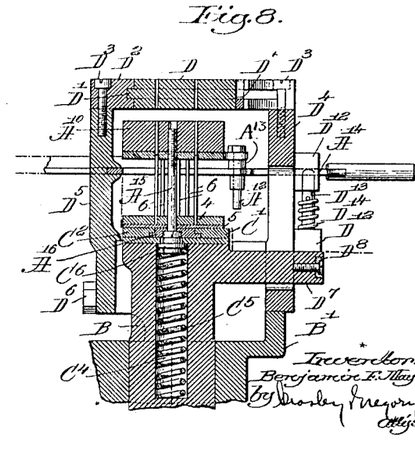
Fig. 8 is a partial vertical section in the line $x^2$, Fig. 6, with the nailing block in position, showing the nail-carrier and driver-plate and drivers and parts of the spindles.

A post $A^{15}$ is screwed into the nail-carrier $A^{10}$ from its lower side as shown in Fig. 8. This post is headed and secures in position the clutch plate $A^{16}$. Above the clutch plate $A^{16}$ the post $A^{15}$ passes through two plates 4, 5, which, together, constitute a driver-plate, the lower ends of the drivers 6 passing through drilled holes in plate 4 and resting on plate 5, which latter plate resists the thrust of the drivers. The upper ends of these drivers normally stand in the nail-carrier, projecting partly through it, and the nails delivered to the nail-carrier by the nail assorting mechanism are supported by the upper ends of the drivers until the nails are driven.

The nailing-block D, which like the nail-carrier, is a "multiple die" having a large number of nail holes of which such number may be used as required to secure the desired outline of nailing, instead of being secured to the upper end of the spindle and movable with it, as has been the case in machines of this character heretofore used, is stationary, being secured to the bed plate $D^2$ which is rigid with the box B' through which the spindle B is guided.

The clutch-plate $A^{16}$ secured to the nail-carrier is arranged to enter between the clutch-plates C' and $C^2$ which are secured to the spindle B, thereby clutching the nail-carrier, driver-plate, and drivers, to the spindle, and these parts are secured in this relation at times by a locking device hereinafter described.

The nailing block has on its edges projections or ribs D', which enter grooves formed in a U-shaped opening in the bed $D^2$, which is connected by screws $D^3$ with plates $D^4$ and $D^5$ connected by screws $D^6$ with the guide box B'.

It will be understood that the upper ends of the drivers always stand in holes in the nail-carrier $A^{10}$, and that the drivers, driver-plate, and the nail-carrier are movable to and fro together from a position under the device or mug where the carrier is supplied with nails, to a position below the nailing block D, where the drivers are in alinement with the holes in the nailing block, and that when the spindle B is elevated, after the plate $A^{16}$ connected with the driver-plate is coupled therewith, the driver-plate and nail-carrier rise until the nail-carrier meets and is arrested by the nailing block D. Then in the further movement of the spindle, the drivers act to drive the nails sustained by them from the holes in the nail-carrier through the holes in the nailing block and into the heel. During this movement of the driver-plate with relation to the nail-carrier the post $A^{15}$ enters the bore $C^4$ in the spindle compressing the spring $C^5$, and the guiding post $A^{17}$ connected with the nail-carrier and extended through the driver-plate enters the bore $C^3$ at the upper end of the spindle. By this means the drivers are maintained in accurate vertical alinement with the holes in the nailing block.

It will be observed that the nail carrier moves from nail-receiving position in such a path that its upper face is in a plane a short distance below the under side of the nailing block. An advantage of this feature is that it permits the nail-receiving cavities of the nail carrier to be of a depth less than the length of the nails, so that the nails project above the upper face of the nail carrier. With this arrangement, the group of nails contained in the nail carrier is within the view of the operator, and if the nails have not been properly supplied to the nail carrier any irregularity in their arrangement may be corrected before the nails are brought into driving position. In the operation of the machine, the nail carrier is raised vertically into contact with the nailing block prior to driving the nails, so that the passages through which the nails are forced are continuous and guide the nails positively during the entire extent of their movement through said passages.

Figures 4, 5:
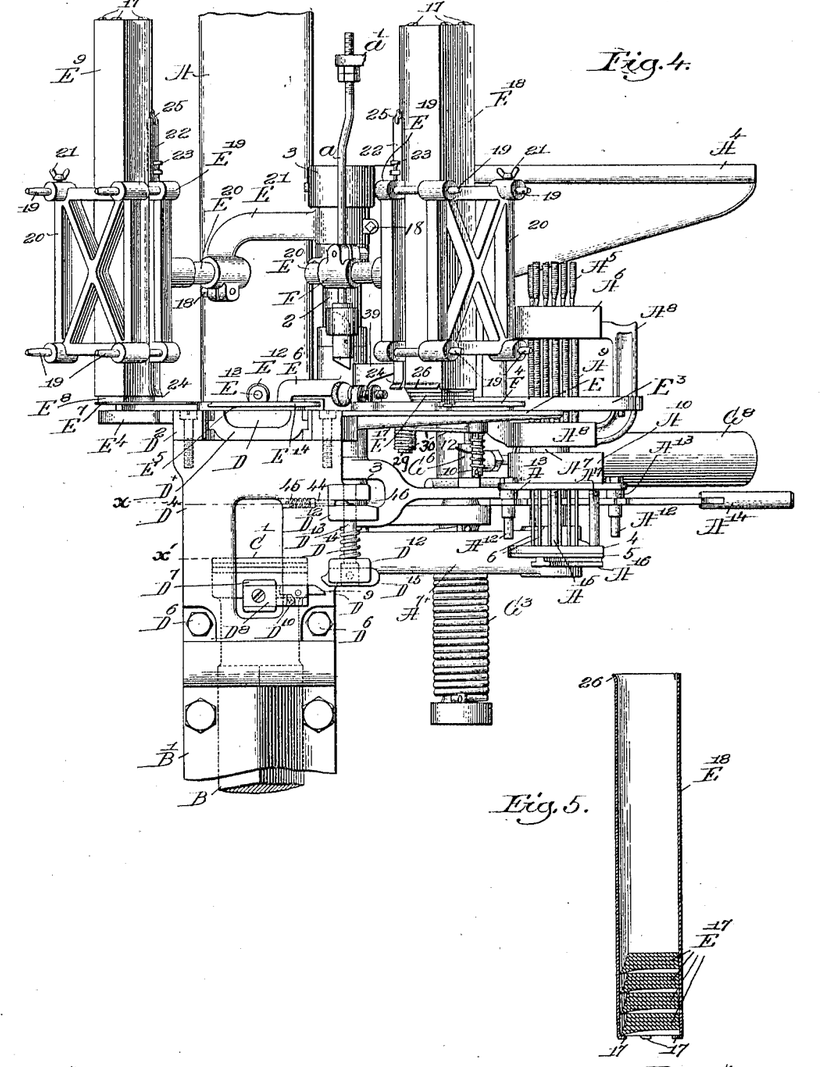
Fig. 4 is a view looking at the parts shown in Fig. 3 from the front of the machine.
Fig. 5 shows the magazine to contain heel blanks, said magazine being represented as supported in position to be filled.
Figure 6:
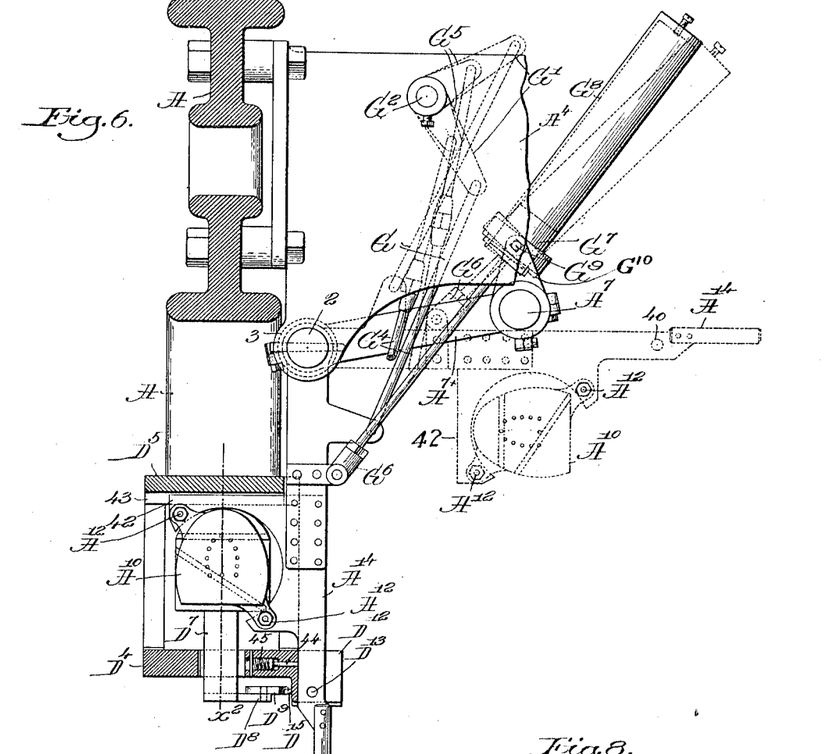
Fig. 6 is a plan view of some of the parts in Fig. 4, the plate sustaining the nailing-block being in section on the line X, Fig. 4, the driver-plate, and its connected parts being shown by full lines in nail driving position, the dotted lines showing the nail-carrier and its attached parts in position to be supplied with nails.
Figure 7:
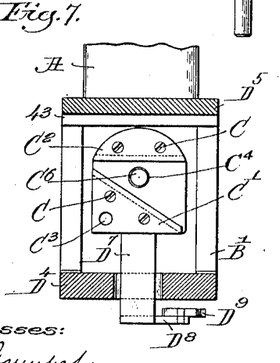
Fig. 7 is a sectional detail in the line $x'$, Fig. 4, chiefly to show the upper end of the spindle that actuates the driver-plate.

The spindle B has a horizontal forward extension $D^7$, see Figs. 6, 7 and 8 having connected to its outer end a block $D^8$ upon which is pivoted a tripping device $D^9$, normally held in the position shown in Fig. 4, by a spring $D^{10}$. The plate $D^4$ has ears $D^{12}$ which receive and guide a locking device $D^{13}$, for retaining the nail-carrier securely in position during the nailing operation. The locking device is represented as a bolt normally sustained by a spring $D^{14}$, the lower end of the bolt having pivoted upon it a plate $D^{15}$, which enters a groove in the lower ear $D^{12}$.

Figure 10:
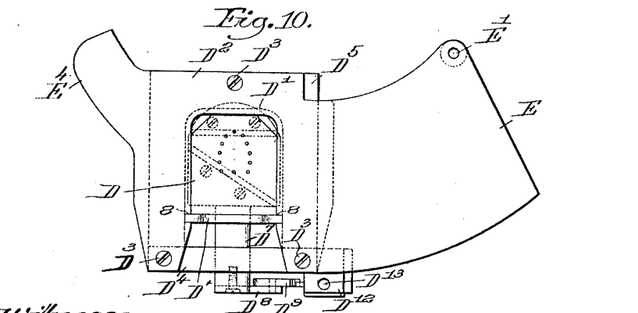
Fig. 10 is a detail in plan view showing the frame for sustaining the nail block and parts connected therewith.

The nailing block D may be withdrawn from the bed whenever it is desired to substitute another for it, and it is retained in its operative position by means of a locking bar $D^x$, the ends of which, see Fig. 10, enter vertical grooves 8 at right angles to the horizontal grooves that receive the ribs D' of the nailing block, so that to change a nailing block the locking bar $D^x$ must be removed. The machine, as herein shown, presents at the right hand side of the bed $D^2$ a wing E, which constitutes a heel blank rest, having as represented, see Fig. 10, a hole E' which receives a stud 10, see Fig. 4, extended from the lower side of a movable plate $E^3$. The plate $E^3$ is normally held in the position shown in Fig. 12 under the heel-magazine $E^{18}$, through the action of a spring 12, surrounding said stud, to maintain the heels in the magazine.

Figure 9:
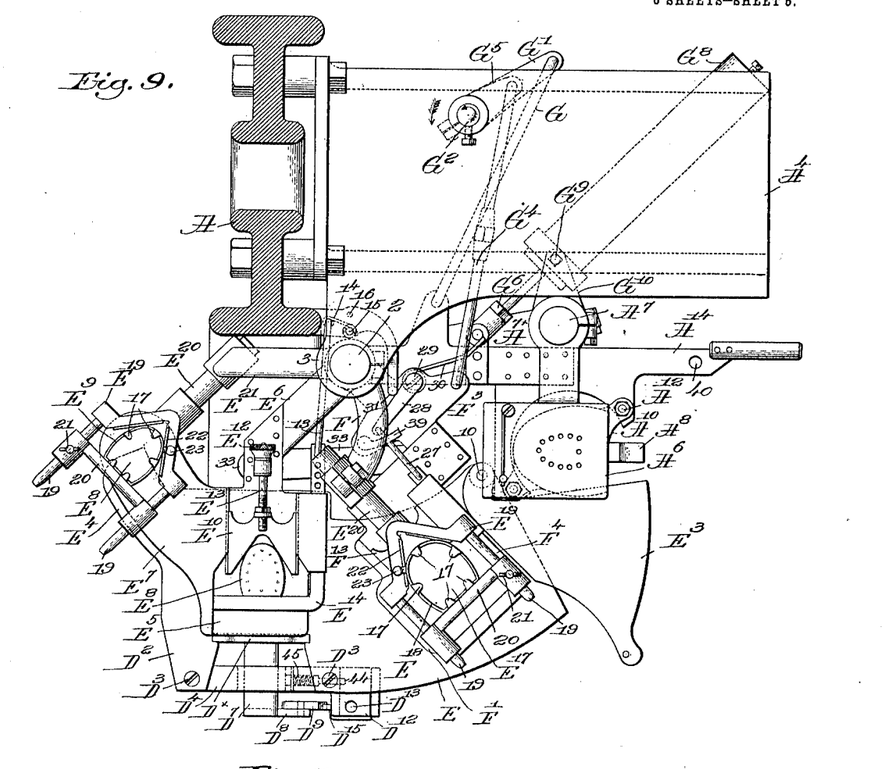
Fig. 9 is a section showing in plan view the nail-carrier and its connected driver plate in position to be supplied with nails, and the heel carrier in position to receive a heel, the top-lift carrier being shown as provided with a top-lift, and presenting it in position to be spanked on a heel.
Figure 11:
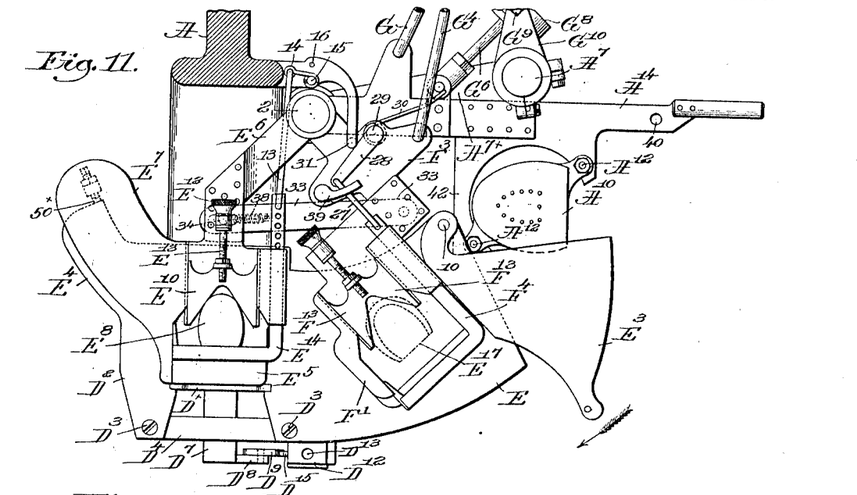
Fig. 11 is a view similar to Fig. 9 with the foot and "mug" by which the nails are guided from the nail assorting mechanism into the nail-carrier, and also the magazines for the heels and the top-lifts removed.
Figure 12:
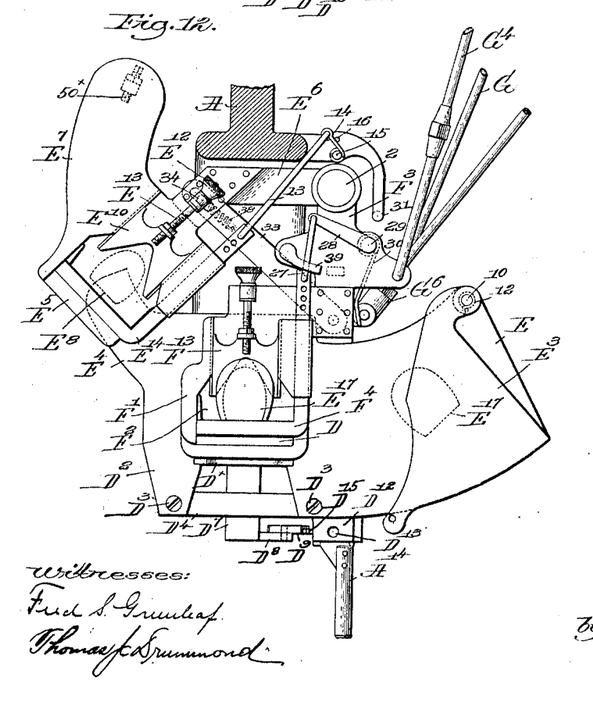
Fig. 12 shows the same parts represented in Fig. 11, but in their other extreme position.

Extended from the opposite side of the bed $D^2$ and at substantially the level of the nailing block is a wing $E^4$ which acts as a guide over which is moved a top-lift carrier $E^5$, composed of a plate sustained by an arm $E^6$ mounted to turn freely about the stud 2, said plate having an extension $E^7$ at its left, see Figs. 9, 11, and 12 which acts to sustain a pile of top-lifts $E^8$ in a top-lift magazine $E^9$, when the top-lift carrier is in the position, Fig. 9. The plate $E^7$ has a stop shown as an adjusting screw $50^x$ that meets the projection $E^4$ and stops the top-lift carrier in proper position between the jack and nailing block.

The top-lift carrier has a back-gage $E^{10}$ guided in grooves in the carrier and made adjustable as to its position by a nut $E^{12}$ on a screw $E^{13}$, and said top-lift carrier has a breast-gage $E^{14}$ provided with holes, one of which is entered by the downturned end of a rod 13, connected with a spring 14, sustained by a stud 15, the operation of the spring being governed by a stud 16, see Fig. 12. Said rod, when the top-lift carrier is in the position shown in said figure, under the top-lift magazine to receive a top-lift, is actuated by stud 16, operating against the tension of spring 14, to move the breast-gage away from the back-gage, so that the lowest top-lift in the top-lift magazine may drop freely upon the top-lift carrier between said gages, as represented, but as the top-lift carrier is moved from the position, Fig. 12, into the position, Figs. 9 and 11, the spring acts automatically to draw the breast-gage $E^{14}$ against the breast of the top-lift, centering the top-lift in the back-gage, and clamping the top-lift firmly during the operation of spanking it upon the heel.

The wing $E^7$ of the top-lift carrier acts to sustain the top-lifts in the top-lift magazine $E^9$ while the said carrier is moving from the position Fig. 9 into the position Fig. 12, and it also sustains the top-lifts in said magazine while the top-lift carrier is moved from the position Fig. 12 into the position Figs. 9 and 11, that is, the wing $E^7$ operates to retain the top-lifts in the top-lift magazine at all times when the top-lift carrier is not in position below the magazine to receive a top-lift.

The heels $E^{17}$, see Fig. 5, are contained in a magazine $E^{18}$. The heel and the top-lift magazines are substantially heel-shaped in cross section, and each has at one end lips 17 arranged to prevent the escape of the top-lifts or heels when they are being filled into the magazine, the latter at such time being inverted as represented in that figure. Each of these magazines is sustained loosely in like magazine holders composed of separable parts to embrace and sustain the magazine, so I need describe but one, viz:— the holder for the top-lift magazine. The holder comprises, as shown in Fig. 9, a V-shaped frame $E^{19}$, having extended backwardly from it a splined shank $E^{20}$ that enters the split hub of an arm $E^{21}$, mounted adjustably on the stud 2, the split hub having a suitable clamping screw as 18, see Fig. 4. Projecting from the frame $E^{19}$ of the holder are a plurality of guides 19 that receive bosses of a retaining device 20 secured in adjusted position by means of a thumb screw 21.

The arm F, mounted adjustably on the stud 2, corresponds with the arm $E^{21}$ and sustains the heel-magazine $E^{18}$. Each frame $E^{19}$ is formed with guides to receive a magazine sustainer 22 represented as a plate free to be slid vertically on the frame. The magazine sustainer may be adjusted vertically to adapt it to the thickness of the heels or top-lifts by means of an adjusting screw 23, see Fig. 4, shown as carried by a lug extended from the sustainer, the screw resting upon the holder $E^{19}$. The rotation of said screw enables the out-turned lower end 24 of the sustainer to be located at the proper distance from the path of movement of the top-lift carrier or heel carrier to provide for any thickness of top-lift or heel with which the magazine may be supplied.

Each magazine has connected with it an ear 25 that embraces loosely the upper end of the sustainer 22. The lower end of each magazine is out-turned on the side nearest the nailing block, as at 26, so that in case a top-lift or heel thicker than usual is being taken from the magazine, the edge of said heel or top-lift may meet the incline and lift the magazine slightly to allow the heel or top-lift to be removed without breakage of parts or displacement of the heel or top-lift in the carrier, such loose connection of the magazine with the sustainer providing for variations in thickness of heels and top-lifts. The lower end 24 of each sustainer 22 is similarly out-turned as shown in Fig. 4, which aids in keeping the heel or top-lift properly positioned in its carrier as the blank is being carried into position over the nailing block.

The heel carrier $F'$ is a plate having a central opening $F^2$ and carried by an arm $F^3$, mounted loosely upon the stud 2. The heel carrier contains an adjustable back-gage $F^{13}$, and a breast-gage $F^4$ like those described as connected with the top-lift carrier, but the rear end of the breast-gage has connected with it a link 27 attached to an arm 28 of a rock shaft 29, mounted in said arm $F^3$ and surrounded by a spring 30 that normally acts after a heel blank $E^{17}$ has been released from the heel-magazine and while it rests between the back-gage and the breast-gage upon the heel rest E before described, to cause the breast-gage $F^4$ to be moved against the breast of the heel to center said heel in the back-gage and clamp it firmly while being moved.

As the heel carrier arrives in position to receive a heel the arm 28 meets a stop 31, see Fig 11, which moves the breast-gage away from the back-gage to open fully the space in the heel carrier. When the heel carrier is in heel attaching position, see Fig. 12, the plate $E^3$ occupies its position shown in that figure, and temporarily closes the lower end of the heel magazine to retain the heels therein, but when the heel-carrier moves from heel attaching position, Fig. 12, into heel receiving position, Figs. 9 and 11, said carrier meets the plate $E^3$ and turns it aside into the position shown in Figs. 4, 9 and 11, thus permitting the lowermost heel in the heel-magazine to enter the space in the heel carrier.

Figure 13:
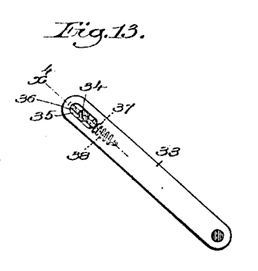
Fig. 13 is a detail showing one form of connection between the heel carrier and top-lift carrier.
Figure 14:
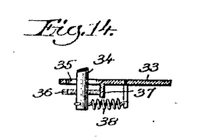
Fig. 14 is a section in the line $x^4$, Fig. 13.

The heel carrier has pivotally mounted upon it a link 33, having at its opposite end a slot 35. Stud 34, extending downwardly from the top-lift carrier, enters loosely this slot 35 in link 33, see Figs. 13 and 14, and the stud receives an adjusting screw 36, the inner end of which acts against a lug 37 of the link 33, the rotation of the adjusting screw moving the link 33 with relation to the stud 34, thereby providing for adjusting the relative positions of the heel carrier and top-lift carrier according to the requirements of the work. The link 33 is connected with the stud of a spring 38 which, after the stop $50^\times$ on plate $E^7$ engages plate $E^4$ as the heel and top-lift carriers are moved to the right, before the heel carrier completes its movement toward the heel magazine, allows further movement of the heel carrier after the top-lift carrier has been arrested.

The heel carrier arm $F^3$ has a projection 39 that, as said carrier, actuated automatically, arrives in position to receive a heel and the nail-carrier arrives in position to be filled, acts upon a starting rod $a$, see Fig. 4, lifting said rod and moving a lever $a'$ which causes to be set into operation a mechanism fully shown and described in United States Letters Patent 707,136, before mentioned, for delivering a series of nails that they may enter the foot plate and the mug.

The nail-carrier $A^{10}$, as I have chosen herein to illustrate my invention, is sustained loosely by the lever $A^{14}$ before mentioned which has its fulcrum on the stud 2. Said lever is connected, through a link G, with an arm $G'$ of a rock shaft $G^2$, surrounded at its lower end by a spiral spring $G^3$ see Fig. 3 that acts normally to turn the rock-shaft in the direction of the arrow Fig. 9. An adjustable two-part link $G^4$ connected with a shorter arm $G^5$ of said rock shaft is connected with a portion of the heel carrier. By means of this spring $G^3$ the nail-carrier is automatically returned from the heel attaching position to nail receiving position, the heel carrier is automatically moved from heel attaching position into position to receive a heel from the heel-magazine, and the top-lift carrier is automatically moved from top-lift receiving position to the attaching position. The adjustment of the length of the link $G^4$ serves to accurately position the heel carrier with relation to the nail-carrier.

The lever $A^{14}$ has joined to it one end of a piston rod $G^6$ having a piston $G^7$ that enters a tube $G^8$, pivotally mounted at $G^9$ between two arms $G^{10}$ of a hub bolted upon the post $A^7$ carrying the foot $A^6$, before described, said piston and sleeve constituting a pneumatic check to arrest the movement of the lever $A^{14}$ sustaining the nail-carrier, as the carrier under the action of the spring $G^3$ is returned automatically into its position for the nail carrier to be supplied with nails.

The lever $A^{14}$ has a hole 40, and when the arm is moved from the position shown in dotted lines Fig. 6, where the nail-carrier is supplied with nails, into the position shown by full lines in said figure, to cause the nail-carrier, driver-plate and drivers to be put into the space between the nailing block and the driver actuating means herein represented as spindle B, said hole 40 is entered by the locking device $D^{13}$, before described which retains the lever and carrier in such position while the spindle B is lifted, as described, to cause the nails in the nail-carrier, located as shown below the nailing block, to be driven therefrom by the drivers through the nailing block and into the heel. During this nail driving movement the tripping-device $D^9$ meets the end of the plate $D^{15}$, and the tripping-device turns, but when in the descending movement of the spindle the drivers are withdrawn from the holes in the nailing block the tripping-device $D^9$ meets the plate $D^{15}$ of the locking device and withdraws the device automatically from engagement with the lever $A^{14}$, letting the spring $G^3$ act to turn the lever into the dotted line position, thus placing the nail-carrier in position to be again supplied with nails and at the same time returning the heel carrier into heel receiving position and moving the top-lift carrier from top-lift receiving position to present a top lift in position to be attached.

When the lever $A^{14}$ occupies the full line position Fig. 6, an arm 42 of said lever, see Fig. 11, enters a groove 43 made at the inner side of the plate $D^5$, the object of this construction is to hold the parts accurately in position so that the headed post $A^{15}$ will slide in its holder without binding as the spindle rises to drive the nails.

The operation of supplying the nail-carrier with nails requires a longer time than any other single operation in the cycle of operations of the machine, and it is of great advantage to insure that the nail-carrier remain in the position to be supplied with nails for the longest possible period of the cycle of operations. To this end, as the lever $A^{14}$ comes into position to be entered by the locking device $D^{13}$, the edge of said lever enters a slot 46 and acts against a loose pin 44, see Fig. 4, and moves the same to compress a spring 45, and when the locking device $D^{13}$ is withdrawn to release the lever $A^{14}$, the spring-pressed pin 44 starts the arm quickly toward the nail receiving position.

The link $A^3$ joined to the beam $A'$ has a shoulder $a^3$ against which coacts an adjustable stop $a^4$ carried by a link $a^5$ coupled with the lower end of the link $A^3$ by a suitable stud $a^6$, and the lower end of the link $a^5$ is pivoted on a stud $a^7$ carried by an arm pivoted at $H^3$ to the frame. On this stud $a^7$ is also pivoted toggle link $a^8$, jointed by a stud $a^9$ to a coöperating toggle link $a^{10}$, in turn pivoted at $a^{12}$ on the frame. The stud $a^9$ has connected with it a link $a^{13}$, pivoted at $a^{14}$ upon the upper end of a lever $b$ mounted upon a stud $b'$ of the frame, and having a roller $b^2$, shown by dotted lines Fig. 1, that enters a groove, shown by dotted lines Fig. 1, in the outer face of the disk $B^{14}$. The movement of the lever $b$ straightens and breaks the toggle joint $a^8$, $a^{10}$, to turn the beam $A'$ about its fulcrum to cause the shoe mounted upon the jack $A^2$ to descend upon the heel $E^{17}$, shown by dotted lines in Fig. 1 as resting on the nailing block, but in practice said heel at such time will be held between suitable gages of the heel carrier.

After the heel has been attached and preparatory to attaching a top-lift, the jack $A^2$ must be lifted to withdraw the heel then attached to the shoe from between the gages of the heel carrier, this being necessary to permit the heel carrier to be moved into position to again receive a heel, and to enable the top-lift carrier, provided with a top-lift, to be brought into position between the nailing block and the lower end of the heel from which project the heads of the nails, that the top-lift may be spanked onto said nails. The top-lift is spanked on the heel by the descent of the jack $A^2$, and at this time the jack is to descend for a less distance than it did in the operation of nailing the heel to the shoe, and this variation in descent is regulated by or through a lever H, mounted on the stub $B^{10}$ and provided with a pin or projection 50 which is acted upon by a cam 51 fast on the shaft $B^{15}$, said lever H acting through an adjustably attached rod H' connected with an arm $H^2$ of a bell crank lever pivoted at $H^3$ to turn a longer arm $H^4$ of said lever, and through a link $H^5$ change the positions of the stud $a^6$ to break slightly the toggles $A^3$, $a^5$, thereby automatically adjusting the parts so that the jack shall not descend so far in the top-lift spanking operation as in the heel attaching position.

In the operation of the machine assuming the parts to be as represented in Figs. 1 and 11, the top-lift carrier not, however, being provided with a top-lift, the first step is to move the nail-carrier, previously provided with nails, into the position shown in Figs. 8 and 12, placing the nail-carrier with its holes in alinement with the corresponding holes in the nailing block and clutching the driver plate to the spindle. The machine is started by treadle $B^{21}$ which causes link 55 to lift a stop 52, disengaging it from a stud 56, carried by an arm 53, fixed to one end of a spring-actuated rock-shaft 54, to which is attached the stop arm $B^{20}$ before described, said link 55 after unlocking the link 52 from the stud 56 acting through a projection 57, to engage a toe 58, connected with the rock-shaft 54 to move the stop arm $B^{20}$ away from the projection $b^{90}$ and allowing the clutch to operate and start the machine.

The shaft $B^{18}$ rotates once and imparts half a revolution to the shaft $B^{15}$. As the shaft $B^{15}$ is rotated the cam carried thereby through the lever $b$ moves the jack to compress the heel-seat end of the sole against the heel, and immediately thereafter through the lever $B^9$, the toggle $B^3$, $B^5$ is straightened, elevating the spindle B to effect the driving of the nails into the heel, and this done the spindle immediately descends, and the lever $b$ is moved to elevate the jack spindle and draw the heel attached to the shoe from the heel carrier. In the further revolution of the shaft $B^{15}$ and its cam the workman still holding his foot on the lever $B^{21}$, said cam actuates the lever H, to break slightly the toggles $A^3$, $a^5$, and at the same time the lever $b$ is again moved to straighten the toggies $a^8$, $a^{10}$, to depress the jack carrying the heel now attached to the shoe against the top-lift, then in position between the jack and the nailing block, and the top-lift having been spanked upon the heel the levers H and $b$ are again moved in the opposite direction to raise the jack into its starting position. The operator may remove his foot from the treadle $B^{21}$, at any time during the second half rotation of the shaft $B^{15}$, and when he does this the end of the stop-arm will descend into position to engage the projection $b^{90}$, and as soon as the projection $b^{90}$ meets the end of the stop-arm the main shaft $B^{18}$ is stopped, and the link 52 drops and engages the stud 56, thus locking the stop-arm in such position that the machine cannot be started until after the treadle $B^{21}$ has again been moved by the workman.

By omitting the head which in machines of this type as heretofore constructed has been carried by the upper end of the spindle, which head sustains not only the nailing block, but also the top-lift and heel carrier, the weight of the spindle B is so materially lessened that it may be moved with less power and more rapidly, and with less wear upon the machine, and as the nailing block is not moved vertically the top-lift carrier and heel carrier have only movements in a plane substantially at right angles to the axis of the spindle B, such movements greatly simplifying the mechanism for actuating the different operative parts with relation to the magazines for holding the top-lifts and heels, to thereby enable a heel nailing machine to be made more nearly automatic in the operations of attaching a heel and top-lift.

In some of the claims I shall use the term "blank" to designate either a heel or a top-lift. The invention is not limited to the mechanism which is herein shown, as various other mechanical constructions may be employed without departing from my invention.

Having described my invention, what I claim and desire to secure by Letters Patent is:—

1. In a machine of the class described, a tube presenting in cross section walls to act as guides for the rounded side edges and the breasts of heel or top-lift blanks to present the breasts of said blanks in substantially the same plane, said tube having at its end opposite that from which said blanks are delivered, means occupying a fixed relation to the body of said tube, to prevent the escape of blanks therefrom while the tube is being filled preparatory to applying the tube to a heeling machine.

2. In a heel-nailing machine, magazine sustaining means, and a magazine shaped to embrace the sides and breasts of heel or top-lift blanks, said magazine having at its delivery end an inclined surface to be acted upon by a blank thicker than usual to enable the entire magazine to be lifted and the blank to be removed therefrom.

3. In a machine of the class described, a magazine shaped to embrace the sides and breasts of and hold a series of blanks, and means to sustain said magazine loosely that it may be permitted movement in the withdrawal of a blank to compensate for variations in thickness of blanks.

4. A magazine for holding heel or top-lift blanks, a magazine holder, a magazine sustainer thereon movable with relation to the holder and having its lower end curved to ride on the upper side of a blank, said magazine being mounted upon said sustainer.

5. In a machine of the class described, a nailing-block arranged for engagement with a heel to be attached and constructed to contain nails to be driven into the heel, means for supplying nails to said nailing block, a plurality of magazines, one to contain heel blanks and the other to contain top-lift blanks, and a heel carrier and a top-lift carrier arranged to be operated in unison and to be moved alternately from their respective magazines to the nailing-block, and from the nailing-block to said magazines.

6. In a heel attaching machine, a magazine and an attaching mechanism, in combination with a blank carrier movable between the magazine and the attaching mechanism, means independent of said carrier for sustaining a series of blanks in said magazine and arranged to be actuated in the movement of said carrier into blank receiving position.

7. In a machine of the class described, a heel blank carrier arranged for movement in a curved path and provided with relatively movable breast gage and back gage for engaging a blank, a magazine for supplying blanks by gravity to said carrier, means rendered effective by the movement of said carrier for imparting relative rectilinear movement to said gages in a direction to cause them to be opened equally on opposite sides of the heel blank, and means for causing a relative approaching movement of the gages to clamp and position said blank.

8. In a machine of the class described, a movable blank carrier having a back gage and a co-acting breast gage, a magazine for supplying blanks by gravity to said carrier, and means operated automatically by the movement of the carrier for reciprocating said breast gage in a straight line relative to said back gage to permit a blank to be received in position between said gages.

9. In a heel nailing machine, a top-lift carrier, a heel carrier, means to move the heel carrier, and a yielding connection between the heel carrier and top-lift carrier.

10. In a heel-nailing machine, a stationary nailing-block arranged to be engaged by the tread face of a heel, a heel-carrier and a top-lift carrier located at opposite sides of said nailing-block, and means to move both said carriers toward and from said nailing-block in a plane parallel with the face of said nailing-block, and a heel-blank or top-lift blank is to be presented alternately over said nailing-block.

11. In a heel-nailing-machine, a stationary nailing-block, a heel-carrier, and a top-lift carrier located at opposite sides of said nailing-block, means to move both said carriers toward and from said nailing-block in a plane parallel with the face of said nailing-block as a heel-blank or a top-lift blank is to be presented alternately over said nailing-block, a nail-carrier, drivers, and means to actuate said drivers and to move said nail-carrier vertically, said carrier contacting with the underside of said nailing-block, and the drivers thereafter in their further movement driving nails from the nail-carrier through the holes in the nailing-block.

12. In a heel-nailing machine, means for supplying heel-blanks, and a heel-blank carrier comprising a breast-gage, a back-gage and a rest to sustain the blank preparatory to entering said carrier, mechanism to move automatically said carrier and rest into receiving position, and means to move one of said gages toward the other to clamp the heel-blank between them.

13. In a heel nailing machine, nail-supplying mechanism, a nailing block, a nail-carrier movable between said mechanism and the nailing block, and a series of drivers connected with said nail-carrier and movable with it and means to move said carrier and drivers in the same direction while driving the nails.

14. In a heel nailing machine, a stationary nailing block, a nail carrier having a depending post, a driver-plate surrounding said post loosely and sustained thereby, a series of drivers carried by said driver-plate and means to move said nail-carrier to meet said nailing block, and then to move said drivers for a greater distance in the same direction that they may drive the nails from said nail-carrier after the latter has been stopped by contact with said nailing block.

15. In a heel nailing machine, a nailing block having a series of nail holes, a nail-carrier, a connected driver-plate sustaining a series of drivers and provided with a clutch member, combined with driver actuating mechanism having a clutch part to engage the clutch member of the driver-plate and move said driver-plate and the nail-carrier parallel to the holes in the nailing block.

16. In a heel nailing machine, a nailing block having a series of nail holes, nail supplying mechanism, a nail-carrier having a series of drivers connected with it, means for moving the nail carrier and drivers from the nail supplying mechanism to the nailing block and means to thereafter move both said drivers and nail-carrier parallel with the holes in the nailing block.

17. In a heel nailing machine, a nailing block having holes for the passage of nails, a movable nail-carrier to present nails to be driven therefrom into a heel, means to retain the nail-carrier with its nails in line with the holes in the nailing block, and mechanism for moving the nail-carrier vertically with relation to the nailing block and for driving the nails from the carrier and through the nailing block.

18. In a heel-nailing machine, a stationary nailing block, driver actuating mechanism, a nail-carrier and connected driver plate and drivers, and means for sustaining said nail-carrier arranged to permit movement of the nail-carrier into and out of position between said nailing block and driver actuating mechanism, and constructed to permit movement of the nail carrier toward the nailing block in the actuation of said driver plate and drivers.

19. In a heel nailing machine, a nailing block, driver actuating mechanism, a nail-carrier and connected drivers, movable into position between said nailing block and driver actuating mechanism, and means to move automatically said driver actuating mechanism and drivers to lift the nail-carrier to contact with the nailing block, and thereafter to drive the nails from the nail-carrier through the nailing block into a heel.

20. In a heel nailing machine, a nailing block provided with driver passages, a series of drivers, a nail carrier for bringing nails into driving position arranged for movement into a position vertically removed from the nailing block, and means for moving the nail carrier vertically into close relation to the nailing block and for actuating the drivers to drive nails from the carrier through the passages of the nailing block.

21. In a nailing machine, a nailing block, a movable arm, a nail-carrier loosely connected with said arm, a driver-plate suspended from said nail-carrier and sustaining a series of drivers, and means to move said driver-plate and drivers vertically, and with it the nail-carrier, toward the nailing block, the said nail-carrier being guided in its vertical movements by said arm.

22. In a heel nailing machine, a nailing block, a heel carrier to receive and sustain a heel while said carrier is out of its heel attaching position, a top-lift carrier, a nail-carrier, means to sustain said nail-carrier, and mechanism actuated by said nail-carrier sustaining means to move the heel and top-lift carrier.

23. In a heel nailing machine, mechanism for attaching heels, mechanism for supplying nails, a nail-carrier movable between said mechanisms, means to lock the carrier to the heel attaching means, means to release automatically said nail-carrier from the heel attaching mechanism, means to return said nail-carrier to the nail supplying mechanism, and a check to arrest said carrier as it arrives in position to be supplied with nails.

24. In a heel nailing machine, a blank carrier, a nail-carrier, means to supply the nail-carrier with nails, means to sustain the nail-carrier, connections between the nail-carrier sustaining means and blank carrier whereby they are moved together, means acting normally to move said nail carrier toward the nail supplying means, and a check to arrest said carrier at the end of its movement.

25. In a heel-nailing machine, a nailing-block, driver-actuating mechanism, a movable nail-carrier having connected with it a driver-plate and drivers, and means to lock said nail-carrier, driver-plate and drivers in operating position between the driver-actuating mechanism and nailing-block preparatory to driving nails from said nail-carrier, and means whereby said carrier, driver-plate and drivers may be moved.

26. In a heel-nailing machine, a blank carrier, a nail-carrier arranged to move the blank carrier, and adjustable connections between said blank carrier and nail carrier to provide for adjusting the blank carrier with relation to the nail carrier.

27. In a heel nailing machine, a nailing block, a movable arm, a nail-carrier sustained thereon and having connected with it a driver-plate and drivers, means to lock said arm and maintain the said nail-carrier, driver-plate and drivers in operating position below the nailing block, and means to thereafter actuate the driver-plate and drivers to drive nails from the nail-carrier through the nailing block into a heel.

28. In a machine of the class described, a stationary nailing block, a shoe-holding jack arranged for vertical movement toward and from said block, a beam pivotally supported intermediate its ends and connected at its forward end with said jack, automatic mechanism connected to the rear end of the beam for imparting a swinging movement thereto to subject the work to pressure between the jack and nailing block preliminary to driving the attaching nails, and means for automatically changing the limit of movement of the jack toward the nailing block preliminary to attaching a top lift.

29. In a heel nailing machine, a stationary nailing block, means to present nails to be driven, a spindle, a lever operatively connected with said spindle, a cam to actuate said lever to move the spindle and drive nails through the nailing block, a shoe holding jack, a second lever, a cam to move it, a toggle lever actuated by said second lever, connections between said toggle lever and shoe holding jack to move the same toward and from the nailing block, a third lever, and means controlled by it to change the positions of said connections to modify the movement of the jack with relation to the nailing block to provide for attaching a top-lift to the heel.

30. In a machine of the class described, heel attaching mechanism, a device for supplying heels, a device for supplying top-lifts, a carrier for transferring heels from said device to the heel attaching mechanism, a carrier for transferring top-lifts from the device supplying top-lifts that said top-lifts may be attached to a heel and means operating automatically to open said heel carrier to receive a heel as the carrier is moved into its receiving position.

31. In a heel nailing machine, a blank carrier, means to move it to present the blank in attaching position, a nail-carrier, driver-plate and drivers, and means to move said nail-carrier and driver-plate and drivers at right angles to the line of movement of said blank carrier in driving the attaching nails.

32. In a heel nailing machine, a nailing block, a heel carrier, a top-lift carrier, a nail-carrier, means to sustain said nail-carrier, and mechanism actuated by said nail-carrier sustaining means to move the heel and top-lift carriers positively into and out of attaching position.

33. In a machine of the class described, a magazine for holding blanks, heel attaching mechanism, a carrier, means for controlling the delivery of blanks from the magazine to the carrier, and means initially controlled by said heel attaching mechanism for moving the carrier from the magazine to the heel attaching mechanism constructed to be automatically brought into action at a predetermined point in the operation of said mechanism and arranged to operate independently of said heel attaching mechanism after being brought into action.

34. In a heeling machine, mechanism for supplying nails, heel attaching mechanism, a carrier for receiving nails from the nail supplying mechanism and presenting them to the heel attaching mechanism, and means for moving the carrier and the heel attaching mechanism to the nail supplying mechanism constructed to be automatically brought into action at a predetermined point in the operation of said heel attaching mechanism and arranged to operate thereafter independently of said heel attaching mechanism.

35. In a heeling machine, mechanism for supplying nails, heel attaching mechanism, a carrier for receiving nails from the nail supplying mechanism and presenting them to the heel attaching mechanism arranged to be moved manually into nail delivering position, and means for moving the carrier from the heel attaching mechanism to the nail supplying mechanism constructed to be automatically brought into action at a predetermined point in the operation of said heel attaching mechanism and arranged to operate independently of said heel attaching mechanism after being brought into action.

36. In a machine of the class described, means for supplying a heel, mechanism for attaching said heel, means for supporting a shoe, mechanism for moving said shoe-supporting means in attaching the heel, and for attaching a top-lift, means for supplying a top-lift, and mechanism for changing the movement of said shoe-supporting means for attaching said top-lift.

37. In a machine of the class described, mechanism for attaching a heel, means for supporting a shoe, mechanism for moving said shoe supporting means twice in the same direction, once for attaching a heel, and again for attaching a top-lift, and means for limiting the extent of said second movement of the shoe supporting means to allow for the thickness of the top-lift.

38. In a heel nailing machine, heel attaching mechanism, a device for supplying blanks, means for retaining blanks in said device, a blank carrier movable between said device and the heel attaching mechanism, and means for automatically moving said blank carrier from the heel attaching mechanism to said device, said blank retaining means being arranged to be automatically actuated to permit the delivery of a blank to said carrier.

39. In a heel nailing machine, a stationary nailing block, nail supplying mechanism, a nail-carrier having connected with it a driver-plate carrying a series or drivers, said nail-carrier being movable between the nailing block and nail supplying mechanism, means to support said carrier and driver-plate to permit vertical movement of the drivers and carrier, and mechanism for actuating the drivers to drive nails from the carrier through the nailing block.

40. In a heeling machine, heel attaching mechanism, heel and top-lift carriers for presenting heels and top-lifts respectively to the heel attaching mechanism, a device for supplying heels to the heel carrier, a device for supplying top-lifts to the top-lift carrier, means for retaining heel blanks in the heel supplying device and top-lifts in the top-lift supplying device, said means being arranged to be actuated by the heel carrier and top-lift carrier respectively to permit heels and top-lifts to be delivered to the respective carriers, means for moving the heel and top-lift carriers between the heel attaching mechanism and the respective devices for supplying heels and top-lifts, and mechanism for actuating the heel attaching mechanism to attach a heel to a shoe and to secure a top-lift to the attached heel.

41. In a heeling machine, a nailing-block, heel-attaching mechanism, heel and top-lift carriers occupying positions at opposite sides of said nailing-block, and adapted to present heels and top-lifts alternately above said nailing-block that said heels and top-lifts may be attached to a shoe, both carriers being movable in the same plane, a device for supplying heels to the heel carrier, a device for supplying top-lifts to the top-lift carrier, means for moving the heel and top-lift carriers between the heel attaching mechanism and the respective devices for supplying heels and top-lifts, nail supplying mechanism, a nail-carrier movable between the nail supplying mechanism and the heel attaching mechanism to present nails to the heel attaching mechanism, and mechanism for actuating the heel attaching mechanism to secure a heel to a shoe.

42. A blank carrier, comprising a breast-gage, a back-gage, and a rest to sustain the blank, means to move said carrier, and means controlled in accordance with the position of said carrier to move said breast-gage toward the back-gage to clamp the blank between them.

43. In a machine of the class described, a nailing block, nail driving means, a movable nail-carrier, means whereby said nail-carrier may be moved laterally of the nailing-block and means to lock said nail-carrier in line with the nailing block to permit nails to be driven from said nail-carrier through the nailing block.

44. In a heel-nailing machine, a stationary nailing-block, nail-supplying mechanism, a nail-carrier having connected with it a driver-plate carrying a series of drivers, said nail-carrier being movable between the nailing-block and nail-supplying mechanism, means to support said nail-carrier and driver-plate to permit vertical movement thereof toward said nailing-block, and mechanism to engage and actuate the driver-plate to drive nails from the carrier through the nailing-block, said mechanism retaining its engagement with the driver-plate to withdraw the same positively.

45. In a machine of the class described, top-lift attaching mechanism, a magazine to contain top-lifts, a top-lift carrier comprising a plate having an extension, said top lift carrier being arranged for movement in a curved path, a back-gage, and a breast-gage, means to move said carrier between said magazine and said attaching mechanism, means for separating said back-gage and breast-gage by a relative rectilinear movement to permit a top-lift to be superposed on said plate, and means to close said gages to clamp the top-lift, said extension, when the top-lift-carrier is in attaching position, sustaining the pile of top-lifts in said magazine, said carrier receiving directly upon it the top-lift when said gages are separated as described and occupy their top-lift receiving position.

46. In a machine of the class described, the combination with a nailing block provided with nail-receiving passages, of a nail carrier for supplying nails to the nailing block and means for supporting said carrier arranged and constructed to permit movement of the carrier laterally of the nailing block and also vertical movement of the carrier with relation to said nailing block.

47. In a machine of the class described, a heel blank carrier arranged for movement in a horizontally curved path and provided with relatively movable breast gage and back gage for engaging the blank, a magazine for supplying blanks by gravity to said carrier, means brought into operation by the movement of the carrier for imparting relative rectilinear movement to said gages in a direction to cause them to be opened equally on opposite sides of the heel blank, and means for causing relative approaching movement of the gages to clamp a blank in position upon the carrier.

48. In a machine of the class described, a nailing block, a carrier for heel blanks arranged for movement into and out of attaching position, a nail carrier sustained for movement between a nail-receiving position and a position in alinement with the nailing block and arranged to move the carrier and a heel carried thereby into attaching position in its movement into alinement with the nailing block.

49. In a machine of the class described, a nailing block, a carrier for bringing a heel to be attached into operative relation to the nailing block and a nail carrier arranged for movement from nail-receiving position into alinement with the nailing block simultaneously with the movement of the heel into attaching position.

50. In a machine of the class described, a nailing block, a blank carrier arranged for movement into and out of attaching position, a nail carrier sustained for movement between a nail-receiving position and a position in alinement with the nailing block and arranged to move the blank carrier into attaching position in its movement into nail receiving position.

51. In a machine of the class described, a stationary nailing block, a heel carrier and a top lift carrier each arranged for movements into and out of attaching position, a nail carrier sustained for movement between a nail-receiving position and a position in alinement with the nailing block and arranged to move the heel carrier and a heel carried thereby into attaching position in its movement into alinement with the nailing block, and means for moving the top lift carrier into attaching position as the heel carrier is moved out of attaching position.

In testimony whereof, I have signed my name to this specification, in the presence of two subscribing witnesses.

BENJAMIN F. MAYO.

Witnesses:
 GEO. W. GREGORY,
 EDITH M. STODDARD.

Copies of this patent may be obtained for five cents each, by addressing the "Commissioner of Patents, Washington, D. C."

Corrections in Letters Patent No. 1,000,534.

It is hereby certified that in Letters Patent No. 1,000,534, granted August 15, 1911, upon the application of Benjamin F. Mayo, of Salem, Massachusetts, for an improvement in "Heel-Nailing Machines," errors appear in the printed specification requiring correction as follows: Page 5, line 18, for the word "of" read *by*; same page, line 73, for the word "arm" read *lever*; page 7, line 103, for the word "and" read *as*; and that the said Letters Patent should be read with these corrections therein that the same may conform to the record of the case in the Patent Office.

Signed and sealed this 28th day of November, A. D., 1911.

[SEAL.]

E. B. MOORE,
*Commissioner of Patents.*